UNITED STATES PATENT OFFICE.

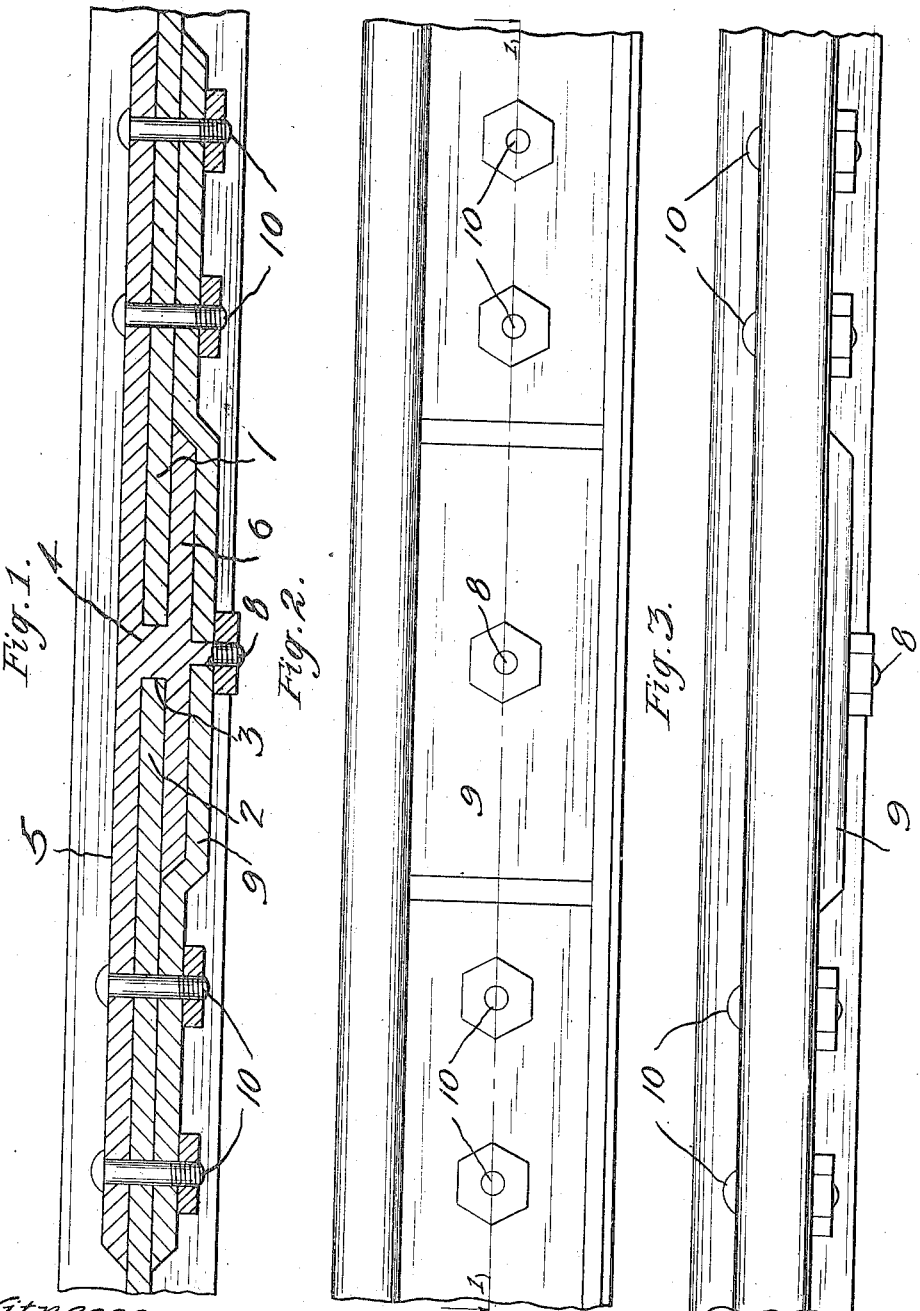

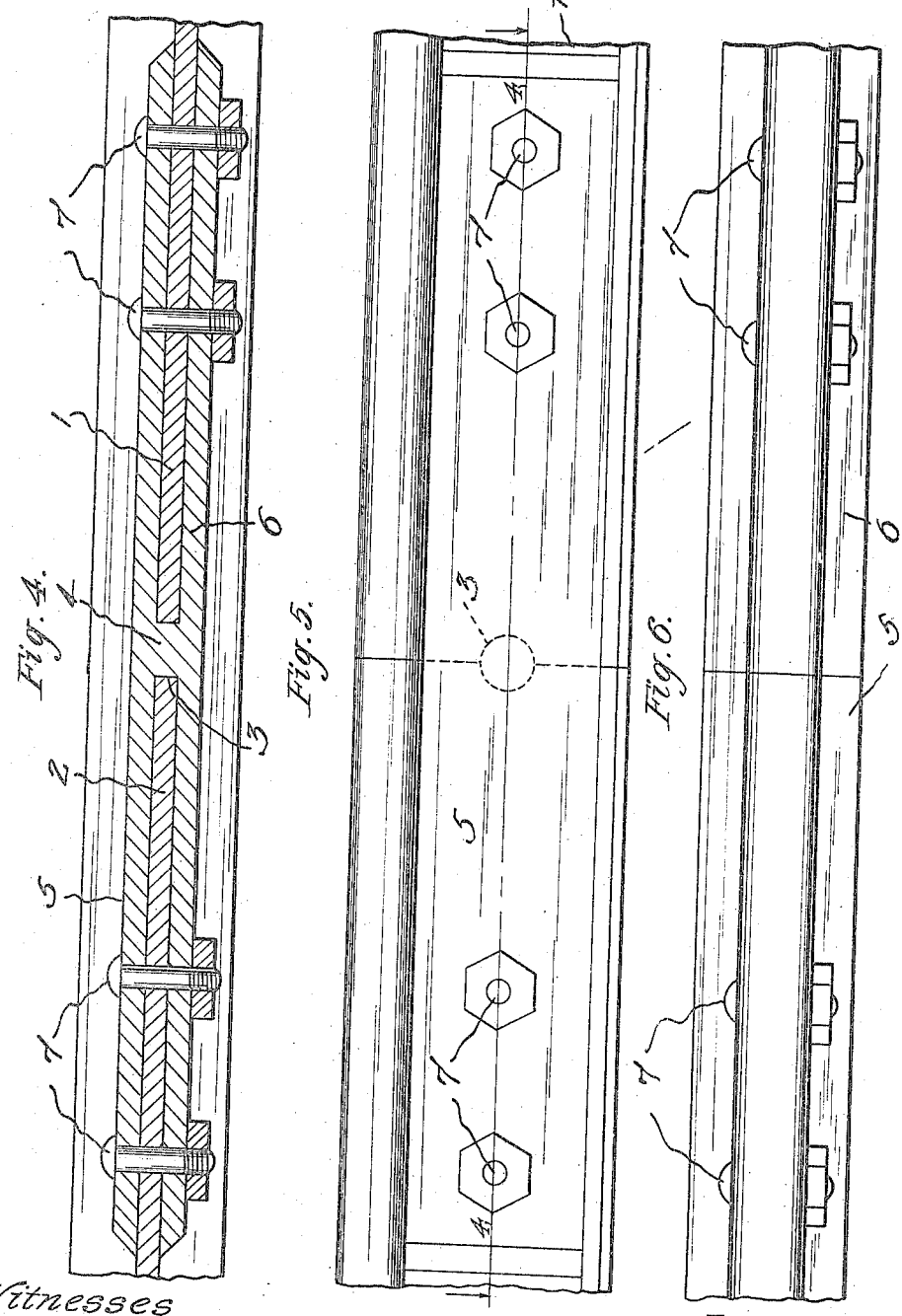

ELIS AHLSTEN, OF MARQUETTE, MICHIGAN.

RAIL-JOINT.

1,249,296.  Specification of Letters Patent.  Patented Dec. 11, 1917.

Application filed April 13, 1917. Serial No. 161,800.

*To all whom it may concern:*

Be it known that I, ELIS AHLSTEN, a citizen of Finland, Russia, residing at Marquette, in the county of Marquette, in the State of Michigan, have invented certain new and useful Improvements in Rail-Joints of which the following is a specification.

This invention relates to improvements in rail joints. One object is to provide a rail joint that is simple in construction, cheap to manufacture, durable and efficient. A further object is to provide means for connecting the opposing ends of a pair of track rails together to form practically a continuous rail to prevent longitudinal and lateral movement of the rails with respect to each other. With the foregoing and other objects in view the invention consists in the combination and arrangement of parts to be hereinafter fully described, pointed out in the claims and illustrated in the accompanying drawings which form a part of this specification and in which—

Figure 1 is a longitudinal sectional view through Fig. 2 on the line 1—1.

Fig. 2 is a side elevation of Fig. 1.

Fig. 3 is a top plan view of Fig. 2.

Fig. 4 is a sectional view of a slightly modified form and is taken on line 4—4 of Fig. 5.

Fig. 5 is a side elevation of Fig. 4.

Fig. 6 is a top view of Fig. 5.

Like reference characters denote corresponding parts throughout the several views.

The reference numerals 1, 2 denote the opposing ends of a pair of track rails to be connected by my improved rail joint. Each rail end is formed with a semi-circular notch 3 to permit passage therethrough of a neck 4 integral with the fish plate 5. The said neck 4 merges into another fish plate 6 adapted to embrace the opposite sides of the rails 1, 2 with respect to fish plate 5. The fish plates 5, 6 as illustrated in Figs. 4, 5 and 6 are connected by the bolts 7 that also pass through the web of the said rails.

In the form shown in Figs. 1, 2 and 3 the fish plate 6 is formed with the threaded stem or bolt 8 which is adapted for insertion in an apertured portion of an angle plate 9 which is adapted for close fitting engagement with the fish plate 6 and with the rail ends and is secured to the latter and to the fish plate 5 by the bolts 10. In placing the rail joint in operative position the rails are manually placed between the fish plates 5, 6 and the plate 9 is then placed in position and the plates bolted to the rails as shown.

What is claimed is:—

1. In combination with the notched ends of opposing railway rails, fish plates spaced apart and adapted to embrace the web portions of said rails, a neck portion connecting said fish plates and passing through the notched portions of said opposing rails, an element extending longitudinally of the web of said opposing rails contiguous to one of said fish plates and also extending longitudinally of the said fish plate and adapted for close fitting engagement with the said rail webs and fish plate, a threaded stem formed upon the last named fish plate and passing through the said element, a nut for said threaded stem, and bolts connecting one of said fish plates and said element to the web of the said rails.

2. In combination with the notched ends of opposing railway rails, parallel fish plates spaced apart and adapted to embrace the web portions of said rails, an integral neck portion connecting said fish plates and passing through the notched portions of said opposing rails, an angle plate adapted for close fitting engagement with the web of said opposing rails and with one of said fish plates, a threaded stem formed upon the last named fish plate and passing through the said angle plate, a nut for said threaded stem, and bolts connecting one of said fish plates and said angle plate to the web of the said rails.

In testimony that I claim the foregoing as my own I have hereto affixed my signature in the presence of two subscribing witnesses.

ELIS AHLSTEN.

Witnesses:
 CHAS. AHLSTEN,
 ANDREW SIVONEN.